United States Patent [19]

Kerber et al.

[11] Patent Number: 4,772,983

[45] Date of Patent: Sep. 20, 1988

[54] METHOD AND ARTICLE FOR A NEARLY ZERO TEMPERATURE COEFFICIENT PRESSURE TRANSDUCER

[75] Inventors: George L. Kerber; Harper J. Whitehouse, both of San Diego, Calif.

[73] Assignee: Linear Measurements, Inc., San Diego, Calif. ; by said Harper J. Whitehouse

[21] Appl. No.: 39,698

[22] Filed: Apr. 20, 1987

[51] Int. Cl.⁴ .......................... G01I 9/12; H01G 7/00
[52] U.S. Cl. ....................................... 361/283; 73/724
[58] Field of Search ................... 361/283; 73/724, 151

[56] References Cited

U.S. PATENT DOCUMENTS

| | | | |
|---|---|---|---|
| 2,848,710 | 8/1958 | Owen | 73/151 X |
| 3,750,476 | 8/1973 | Brown | 73/724 |
| 3,858,097 | 12/1974 | Polye | 73/724 X |
| 3,911,902 | 10/1975 | Delpy | 73/724 X |
| 4,495,820 | 1/1985 | Shimada et al. | 73/724 |

*Primary Examiner*—Donald A. Griffin
*Attorney, Agent, or Firm*—Morland C. Fischer

[57] ABSTRACT

A method and the resulting article for providing a nearly zero temperature coefficient pressure transducer preferably comprising a cylindrical capacitor whose capacitance is a function of both externally applied pressure and, undesirably, of temperature. The variation of capacitance with temperature may be greatly minimized by selectively choosing a transducer material characterized by particular parameter constants such that the temperature coefficient of Young's modulus ($\alpha_E$) is equal in magnitude but opposite in sign to the temperature coefficient of linear expansion ($\alpha_l$). Moreover, the thermal variation of capacitance can be further minimized by selectively choosing a transducer material whose temperature coefficient of linear expansion and of Young's modulus are nearly zero. Fabricating a capacitance pressure transducer from materials characterized by $\alpha_E$ and $\alpha_l$ which are both equal and opposite in sign and/or very small in magnitude will greatly reduce the high pressure, temperature sensitivity of the transducer, especially when compared with the temperature sensitivity under pressure characteristics of conventional fused quartz pressure transducers.

14 Claims, 1 Drawing Sheet

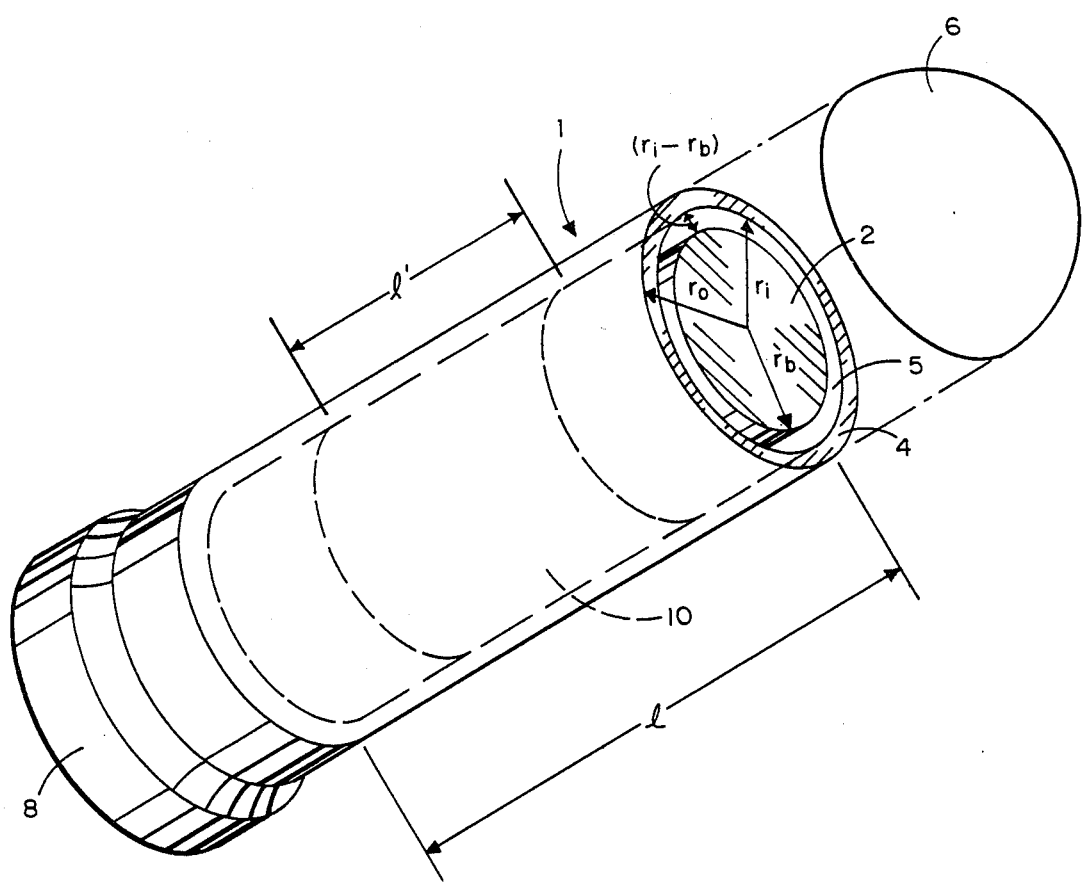

METHOD AND ARTICLE FOR A NEARLY ZERO TEMPERATURE COEFFICIENT PRESSURE TRANSDUCER

CROSS-REFERENCE TO RELATED APPLICATIONS

This application is a substitute for application Ser. No. 648,733 filed Sept. 10, 1984 and now abandoned.

BACKGROUND OF THE INVENTION

1. Field of the Invention

This invention relates to a method and the resulting article for providing a capacitance pressure transducer having a nearly zero temperature coefficient of capacitance under pressure. Such a transducer has particular application in the petroleum industry for accurately sensing down hole pressures within an oil or gas well.

2. Prior Art

Generally known to the prior art is a capacitance pressure transducer of the type having a pair of fused quartz cylinders which are concentrically aligned with and separated from one another so that a small gap is established therebetween. The capacitance of the transducer is dependent upon the size of the gap, such that changes in capacitance can be measured by an external circuit which is electrically connected to the capacitor electrodes. The electrodes are disposed in the gap and attached to opposing surfaces of the concentrically aligned cylinders so as to be responsive to pressure induced changes in the gap. Examples of the foregoing transducer configuration are available by referring to either of the following U.S. Pat. Nos.: 3,750,476, Aug. 7, 1973; 4,064,549, Dec. 20, 1977.

Ideally, each of the concentrically aligned cylinders should be at thermal equilibrium so as to avoid temperature gradient-related changes to the size of the gap. In practice, however, the temperature of the cylinders at the interior and exterior of the transducer assembly are frequently different. That is, both temperature and pressure are variable parmeters. Unlike pressure, the effects of temperature on a transducer assembly of the type hereinabove described are usually not instantaneously reflected. Therefore, prior to calibrating a pressure transducer of conventional construction and collecting pressure measurements therefrom, some time delay is initially introduced to permit the transducer cylinders to reach thermal equilibrium. Such delay results in an inefficient and time consuming pressure sensing scheme.

What is more, and as will be recognized by those skilled in the art, both temperature and pressure are variable parameters. Unlike pressure, the effects of temperature on a transducer assembly of the type hereinabove described are usually not instantaneously reflected. Therefore, prior to calibrating a pressure transducer of conventional construction and collecting pressure measurements therefrom, some time delay is initially introduced to permit the transducer cylinders to reach thermal equilibrium. Such delay results in an inefficient and time consuming pressure sensing scheme.

As will also be recognized by those skilled in the transducer art, the dimensions of the cylindrical transducer components are known to change with temperature. However, the significance of the temperature variation of the elastic constants of the transducer materials on the overall temperature coefficient of the transducer is not generally known to those skilled in the art. By way of particular example, a major contributing factor to the temperature coefficient of capacitance of a fused quartz pressure transducer is the temperature variation of the elastic constant known in the art as Young's modulus. For fused quartz, the temperature coefficient of Young's modulus is approximately 115 parts per million per degree C. The thermal coefficient of linear expansion of fused quartz is approximately 0.55 parts per million per degrees C. Thus, the temperature coefficient of capacitance of such a fused quartz transducer at any pressure other than zero is almost entirely a consequence of Young's modulus.

Capacitance pressure transducers have been fabricated in the past with materials characterized by a nearly zero thermal coefficient of linear expansion. One such suitable material is fused quartz. However, fused quartz characteristically becomes more rigid (i.e. Young's modulus increases) when heated. Because of this characteristic, fused quartz is not fully satisfactory for implementing a pressure transducer which will be subjected to either high or changing temperatures.

Accordingly, nothing is known which has suggested the fabrication of a capacitance pressure transducer from a particular transducer material which is characterized by certain parameter constants (i.e. the temperature coefficients of linear expansion and Young's modulus), such that the transducer assembly will advantageously have a much smaller temperature coefficient of capacitance under pressure than heretofor available from a conventional fused quartz transducer.

SUMMARY OF THE INVENTION

A method and the resulting article are disclosed for a capacitance pressure transducer which is advantageously characterized by a nearly zero temperature coefficient of capacitance. Such a transducer has particular application to the petroleum industry and to accurately sensing pressures in a subsurface oil or gas well. According to a first preferred embodiment, the transducer is fabricated from a particular transducer material (e.g. a glass-ceramic) having a temperature coefficient of Young's modulus ($\alpha_E$) and a temperature coefficient of linear expansion ($\alpha_l$) which are close to zero (i.e. $\alpha_E$ and $\alpha_l \approx 0$). Therefore, such a transducer will be characterized by not only a nearly zero temperature coefficient of capacitance but also a nearly zero temperature gradient coefficient of capacitance, so that sensitivity to thermal gradients can be reduced. According to a second preferred embodiment, the transducer is fabricated from a transducer material, the composition of which is tailored to the geometry of the transducer assembly. That is, for a cylindrical transducer geometry, the composition of the transducer material is adjusted so that the temperature coefficient of Young's modulus will be equal in magnitude but opposite in sign to the temperature coefficient of linear expansion (i.e. $\alpha_E = -\alpha_l$). Thus, a transducer assembly can be constructed from a material such that changes in Young's modulus with temperature will be cancelled by corresponding changes in the coefficient of linear expansion with temperature. Accordingly, such a transducer will be characterized by a nearly zero temperature coefficient of capacitance, whereby to minimize the complexity of the transducer calibration and any corrections based on such calibration.

BRIEF DESCRIPTION OF THE DRAWINGS

The single FIGURE of the drawings shows a cylindrical capacitance pressure transducer in which the variation of capacitance with temperature can be greatly minimized by making such transducer from a particular transducer material which is selectively chosen in accordance with the presently disclosed invention.

DESCRIPTION OF THE PREFERRED EMBODIMENTS

The method and the resulting article for providing a capacitance pressure transducer which achieves a nearly zero temperature coefficient of capacitance under pressure as described as follows. According to a first preferred embodiment of the present invention, it has been discovered that the fabrication of such a pressure transducer is accomplished by selecting a constituent transducer material which is characterized by a Young's modulus that is essentially constant with temperature (i.e., the thermal coefficient of Young's modulus $\alpha_E$ is very small and preferably zero). Moreover, the dimensions of such material must also remain essentially constant with temperature (i.e., the thermal coefficient of linear expansion $\alpha_l$ is likewise very small and preferably zero).

In the past, it has been known to select a transducer material having a thermal coefficient of linear expansion close to zero (i.e. $\alpha_l = 0$). One such transducer material which has been commonly selected is fused quartz. However, fused quartz is not ideal, because Young's modulus increases with increasing temperature until the melting temperature is approached. In the present embodiment, it has been discovered that, when selecting or manufacturing an ideal transducer material, not only must a change in the coefficient of linear expansion with temperature be close to zero, but a change of Young's modulus with temperature must also be close to zero in order to assure a nearly zero temperature coefficient of capacitance under pressure.

An analysis of the temperature sensitivity of a capacitance pressure transducer which is fabricated in accordance with the present method from commercially available materials is now described while referring to the single FIGURE of the drawings. Briefly, capacitance pressure transducer 1 includes a solid, circular inner cylinder 2 and a hollow, circular outer cylinder 4. The inner and outer cylinders are concentrically aligned relative to one another, so that a small gap 5 is established therebetween, whereby a pressure sensitive capacitor assembly can be formed.

The capacitor assembly of cylinders 2 and 4 is interconnected between an (optional) pressure dome 6 and a base 8. Pressure dome 6 may be provided with a hemispherical configuration so as to suitably protect the interior of transducer 1. A pair of electrically conductive, cylindrical capacitor electrodes (only the outermost 10 of which being shown in phantom) is arranged in a face-to-face alignment along axial lengths of the inner and outer cylinders 2 and 4 at the interior of transducer 1. The electrodes provide an indication of a change in pressure corresponding to a change in the size (i.e. width) of gap 5.

More particularly, the capacitance of pressure transducer 1 is determined by the length of the electrodes, e.g. l', and the width of the gap 5 which changes as a function of the difference between interior and exterior pressures. Since transducer 1 is a differential sensor, the interior of the transducer should be evacuated at gap 5 in order to eliminate changes in interior pressure caused by temperature changes. As will be recognized by those skilled in the art, the interior pressure for a non-evacuated capacitance transducer is expressed by the relationship:

$$p_{in} V_{in} = nRT,$$

wherein $P_{in}$ is the interior pressure, $V_{in}$ is the interior volume, T is the temperature, n is the number of moles of gas, and R is the gas constant.

For a more detailed description of a capacitance pressure transducer assembly similar to that just described, reference may be made to application Ser. No. 577,166 filed Feb. 6, 1984, and now U.S. Pat. No. 4,538,466 issued Sept. 3, 1985, the teachings of which are incorporated herein by reference.

Referring again to the drawing, the outer and inner radii of outer cylinder 4 are designated $r_o$ and $r_i$, respectively. The length of cylinder 4 is designated l. According to available formulas for stress and strain, it is known that a change of the inner radius ($\Delta r_i$) and length ($\Delta l$) of outer cylinder 4 for a give uniform external Pressure (P) can be represented by the relationships:

$$\Delta r_i = \frac{P r_i r_o^2 (2 - \mu)}{E(r_o^2 - r_i^2)} \tag{1}$$

and $$\Delta l = \frac{P l r_o^2 (1 - 2\mu)}{E(r_o^2 - r_i^2)} \tag{2}$$

where E is Young's modulus and $\mu$ is Poisson's ratio. For this analysis, Young's modulus and Poisson's ratio are assumed not to vary with applied pressure.

The outer radius and length of inner cylinder 2 are designated $r_b$ and l, respectively, where $r_b$ is less than $r_i$. Thus, the dimension of gap 5 between concentrically aligned cylinders 2 and 4 is designated $r_i - r_b$, which dimension, as previously disclosed, changes as a function of an external pressure applied to outer cylinder 4. The capacitance of pressure transducer 1, ignoring end effects, is approximately represented as follows:

$$C \cong \frac{2\pi \epsilon_o l'}{\ln \frac{r_i - \Delta r_i}{r_b}} \tag{3}$$

where ln is the natural logarithm and $\epsilon_o$ is the vacuum dielectric constant and l' is the length of the cylindrical electrodes, e.g. designated 10.

The capacitance C of transducer 1 as a function of pressure is measured by an external resistance-capacitance (RC) oscillator (not shown) which is electrically connected to each of the conductive capacitor electrodes. The frequency (f) of the oscillator is represented by:

$$f = \frac{1}{RC} = \frac{\ln \frac{r_i - \Delta r_i}{r_b}}{2\pi \epsilon_o l' R} \tag{4}$$

where R is the oscillator resistance.

Using equ. (1), equ. (4) becomes $$f = \frac{1}{2\pi\epsilon_0 l'R} \ln\left(\frac{r_i}{r_b}\left(1 - \frac{Pr_o^2(2-\mu)}{E(r_o^2 - r_i^2)}\right)\right) \quad (5)$$

and making use of the relation $\ln(1+\epsilon) \approx \epsilon$ for $\epsilon \ll 1$, equ. (5) reduces to $$f = \frac{\ln(r_i/r_b)}{2\pi\epsilon_0 l'R} - \frac{1}{2\pi\epsilon_0 l'R} \frac{Pr_o^2(2-\mu)}{E(r_o^2 - r_i^2)}. \quad (6)$$

Equ. (6) shows that the frequency of the oscillator is a linear function of pressure. However, $E = E(T)$, $\mu = \mu(T)$ and $l' = l'(T)$; therefore, f varies with temperature, too.

The linearized equations of thermal expansion for $l'$, $r_i$, $r_o$, and $r_b$ are $$l' = l_o'(1 + \alpha_l(T - T_o)) \quad (7)$$

$$r_i = r_{io}(1 + \alpha_l(T - T_o)) \quad (8)$$

$$r_b = r_{bo}(1 + \alpha_l(T - T_o)) \quad (9)$$

$$r_o = r_{oo}(1 + \alpha_l(T - T_o)) \quad (10)$$

and the linearized equations of thermal variation of E and $\mu$ are as follows:

$$E = E_0(1 + \alpha_E(T - T_o)) \quad (11)$$

$$\mu = \mu_0(1 + \alpha_\mu(T - T_o)) \quad (12)$$

Using the above equations and the relationship $$[1 + \alpha_l(T - T_o)][1 + \alpha_E(T - T_o)] \approx 1 + (\alpha_E + \alpha_l)(T - T_o) \quad (13)$$

equ. (6) can be written as $$f = f_o - \frac{Pr_{oo}^2(2 - \mu_0(1 + \alpha_\mu(T - T_o)))}{2\pi\epsilon_0 R l'_o E_0(1 + (\alpha_E + \alpha_l)(T - T_o))(r_{oo}^2 - r_{io}^2)} \quad (14)$$

where $$f_o = \frac{\ln(r_{io}/r_{bo})}{2\pi\epsilon_0 R l'_o [1 + \alpha_l(T - T_o)]} \quad (15)$$

If both $\alpha_E$ and $\alpha_l$ are zero, then $$f = \frac{\ln(r_{io}/r_{bo})}{2\pi\epsilon_0 R l'_o} - \frac{Pr_{oo}^2(2 - \mu_0(1 + \alpha_\mu(T - T_o)))}{2\pi\epsilon_0 R l'_o E_0(r_{oo}^2 - r_{io}^2)} \quad (16)$$

and temperature dependence of f is nearly zero. The contribution to f from $\alpha_\mu$ is very small. Materials with both $\alpha_E$ and $\alpha_l$ nearly zero are available commercially.

For example, let
$\alpha_\mu = 0$
$\mu_o = 0.24$
$\alpha_E = 0$
$\alpha_l = 0.1$ ppm/°C.
$E_o = 13.2 \times 10^6$ psi
$l'_o = 3.175 \times 10^{-2}$ meter
$R = 100K$ ohm
$\epsilon_o = 8.85 \times 10^{-12}$ farad/meter
$r_{oo} = 0.3160$ in
$r_{io}32\ 0.2500$ in
$r_{bo} = 0.2480$ in.

Upon evaluation of equ. (14) using the above constants for a commercially available glass-ceramic material, the temperature coefficient of frequency ($\alpha_f$) is found to be:

$\alpha_f = 0.0045$ Hz/°C.

at zero pressure and of $\alpha_f = 0.0015$ Hz/°C.

at 15,000 psi, where $\alpha_f$ is defined as $$\alpha_f = \left.\frac{\Delta f}{\Delta T}\right|_p \quad (17)$$

and $\Delta T = 150°$ C.

Repeating the calculation for fused quartz which has a very small thermal expansion coefficient ($\alpha_l = 0.55$ ppm/°C.) but large temperature coefficient of Young's modulus ($\alpha_E = 115$ ppm/°C.), we obtain a temperature coefficient of frequency at zero pressure of $\alpha_f = 0.025$ Hz/°C.

and at 15,000 psi of $\alpha_f = -3.63$ Hz/°C.

for at $\Delta T$ of 150° C. The large value of $\alpha_f$ at high pressures is due entirely to the large temperature coefficient of Young's modulus of fused quartz.

No capacitance pressure transducer is known which is fabricated from a material having properties as just described (i.e. $\alpha_E$ and $\alpha_l \approx 0$). However, it has been additionally discovered that certain available materials possess the aforementioned characteristics and are suitable for fabricating a pressure transducer having a nearly zero thermal coefficient of capacitance under pressure. More particularly, such materials may be characterized as a glass-ceramic. One such suitable transducer material is known by the trademark ZERO-DUR and is manufactured by the Schott Optical Company. Another suitable transducer material is known by the trademark CERVIT and has been manufactured by the Owens Illinois Corporation. Although each of the aforementioned materials is known and available, it has heretofore been unknown to use either of such materials to form a capacitance pressure transducer of the type described herein, so that a pressure transducer assembly having a nearly zero thermal coefficient of capacitance under pressure can be fabricated.

According to a second preferred embodiment of the present invention, the precise composition of a transducer material is tailored to correspond with the geometry or shape of the transducer under construction. More particularly, a desired transducer geometry is initially chosen. A mathematical model of the transducer geometry is then prepared and analyzed by means of suitable computer software. Finally, a transducer material is customized having a characteristic such that any change in Young's modulus or other elastic constants with temperature is matched by a corresponding and opposite change in linear dimension with temperature.

Cylindrical capacitance pressure transducers, such as that shown in the drawing, generally require the cancellation of the temperature coefficient of Young's modulus by the temperature coefficient of linear expansion for a minimum temperature coefficient of capacitance under pressure. By choosing a transducer material which is characterized by a temperature coefficient of Young's modulus which is equal in magnitude but opposite in sign to its temperature coefficient of linear expansion (i.e., $\alpha_E = -\alpha_l$), the temperature coefficient of frequency can also be minimized. Materials such as lead oxide glasses characteristically have a respective $\alpha_E$ and $\alpha_l$ on the order of 1 to 10 ppm/°C. One such material (e.g. a high lead, lead alkalide, silicate glass compised of 35% $S_iO_2$, 7% $K_2O$, and 58% PbO) has an $\alpha_E \cong -9.0$ ppm/°C. and an $\alpha_l \cong +9.1$ ppm/°C. so that $\alpha_E + \alpha_l \approx 0$. By way of example, a commercially available high lead, lead alkalide, silicate glass which has both the aforementioned characteristics and composition is described in GLASS ENGINEERING HANDBOOK, 2d, E. B. Shank, McGraw-Hill Book Company, 1958, page 4. The temperature coefficient of Poisson's ratio for this material is nearly zero ($\alpha_\mu \approx 0$), as well. Thus, evaluation of equ. (14) for this particular lead oxide glass yields nearly pressure independent temperature coefficient of frequency of $\alpha_f = 0.41$ Hz/°C.

An ideal transducer material, as described in this second preferred embodiment, can be customized from a mixture of different glasses having different oxides, so that by selecting the proper mixture of constituent glasses, the variation of Young's modulus with temperature can be adjusted to be equal and opposite to the variation of thermal expansion. Examples of such glasses include lead oxide glasses, such as that described above.

A method has been disclosed herein for fabricating an ideal pressure transducer having a temperature coefficient of Young's modulus and a temperature coefficient of linear expansion which minimizes the sensitivity of the transducer under pressure to temperature changes by choosing the transducer material so as to be characterized by a nearly zero $\alpha_E$ and $\alpha_l$ (e.g., $\alpha_E < 10$ ppm/°C.). Moreover, significant reduction in temperature sensitivity at high pressure can also be achieved using materials with $\alpha_E = -\alpha_l$ as compared to fused quartz whose $\alpha_E$ and $\alpha_l$ are 115 ppm/°C. and 0.55 ppm/°C. respectively.

In order to reduce the effects of temperature, glasses should be chosen which have a minimum $\alpha_l$ while simultaneously satisfying the relationship $\alpha_E = -\alpha_l$. A further reduction of the temperature coefficient of capacitance may also be achieved by selecting glasses which not only satisfy the above relationship, but have a zero temperature coefficient of Poisson's ratio, as well.

Commercially available glasses which are characterized by the hereinabove disclosed properties have been found to be suitable for fabricating an ideal capacitance transducer assembly which advantageously has a much smaller temperature coefficient of capacitance under pressure than that otherwise expected from a conventional fused quartz transducer. Thus, such transducer will be particularly suitable for sensing down hole pressures in a petroleum oil or gas well without being susceptible to undesirable variations of capacitance with temperature.

It will be apparent that while a preferred embodiment of the invention has been shown and described, various modifications and changes may be made without departing from the true spirit and scope thereof. For example, the presently disclosed method is not to be regarded as being limited to a cylindrical capacitor and may also be applied to other configurations, such as a parallel plate capacitance transducer.

Having thus set forth the preferred embodiment, what is claimed is:

1. A capacitance pressure transducer having dimensions which change in response to an elastic deformation caused by the application of an external pressure, said transducer comprising a material characterized by a dominant elastic modulus which causes the capacitance of said transducer to change with pressure, said dominant elastic modulus having a temperature coefficient that is small in magnitude, such that the thermal stability of said transducer under pressure is improved and the variation of capacitance with temperature is reduced as an external pressure is applied to said transducer.

2. The pressure transducer recited in claim 1, wherein the material of said transducer is further characterized by a temperature coefficient of linear expansion and a temperature coefficient of Young's modulus ($\alpha_E$) which are close to zero, said dominant elastic modulus being Young's modulus.

3. The pressure transducer recited in claim 2, wherein the material of said transducer is also characterized by a temperature coefficient of linear expansion which is approximately in magnitude but opposite in sign to the temperature coefficient of Young's modulus.

4. The pressure transducer recited in claim 2, wherein the material of said transducer is a glass-ceramic material.

5. The pressure transducer recited in claim 4, wherein the material of said transducer is that known as CERVIT.

6. The presence transducer recited in claim 4, wherein the material of said transducer is that known as ZERODUR.

7. The pressure transducer recited in claim 1, wherein said transducer further comprises a pair of cylinders to be concentrically aligned relative to one another such that a gap is formed therebetween, the capacitance of said transducer varying as the width of said gap changes with a change in the external applied pressure.

8. The pressure transducer recited in claim 7, wherein the gap formed between said cylinders is evacuated.

9. A capacitance pressure transducer by which to improve thermal stability and reduce the variation of capacitance with temperature under an external pressure, said transducer comprising a material characterized by a temperature coefficient of linear expansion ($\alpha_l$) which is approximately equal in magnitude but opposite in sign to the temperature coefficient of Young's modulus ($\alpha_E$).

10. The pressure transducer recited in claim 9, wherein the material of said transducer is also characterized by a temperature coefficient of linear expansion and a temperature coefficient of Young's modulus which are close to zero.

11. The pressure transducer recited in claim 9, wherein the material of said transducer is also characterized by a temperature coefficient of Poisson's ratio which is close to zero.

12. The pressure transducer recited in claim 9, wherein the material of said transducer is a lead oxide glass.

13. The pressure transducer recited in claim 9, wherein said transducer further comprises a pair of cylinders concentrically aligned relative to one another such that a gap is formed therebetween the capacitance of said transducer varying as the width of said gap changes with a change in the external applied pressure.

14. The pressure transduceer recited in claim 13, wherein the gap formed between said cylinders is evacuated.

* * * * *

UNITED STATES PATENT AND TRADEMARK OFFICE
CERTIFICATE OF CORRECTION

PATENT NO. : 4,772,983

DATED : September 20, 1988

INVENTOR(S) : George L. Kerber et al

It is certified that error appears in the above—identified patent and that said Letters Patent is hereby corrected as shown below:

```
Claim 3, line 4, after "approximately"
insert --equal--.
```

Signed and Sealed this

Twenty-second Day of May, 1990

Attest:

Attesting Officer

HARRY F. MANBECK, JR.

Commissioner of Patents and Trademarks